No. 884,879. PATENTED APR. 14, 1908.
K. R. VAN WINKLE.
COMBINED SHUCKING RACK AND FODDER BINDER.
APPLICATION FILED APR. 13, 1907.
2 SHEETS—SHEET 1.
Fig-1-
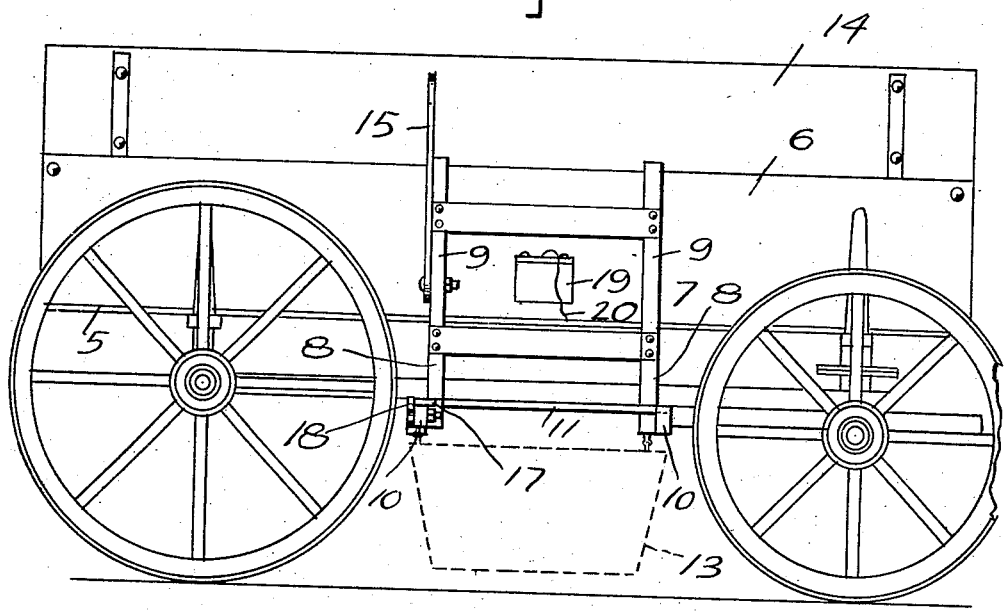
Fig-2-
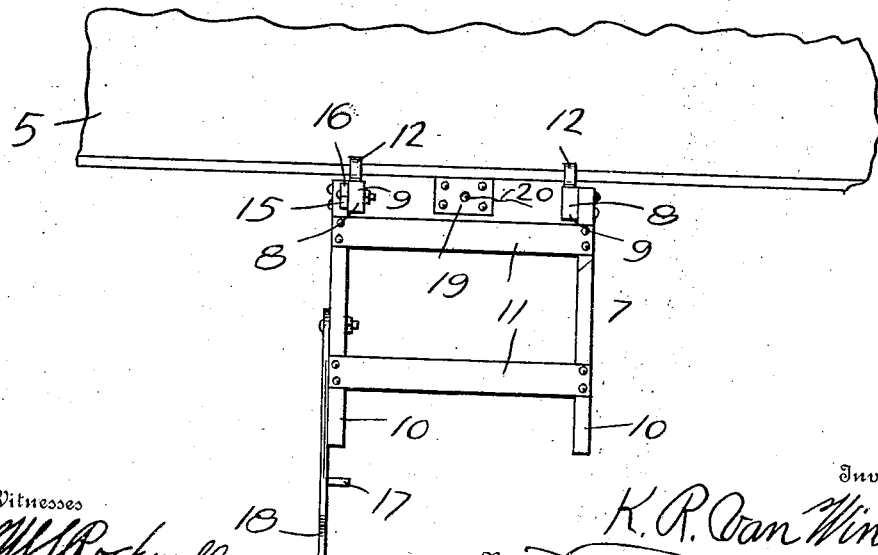
Witnesses
W. J. Rockwell
F. McCartney
Inventor
K. R. Van Winkle
By Chandler & Chandler
Attorneys No. 884,879. PATENTED APR. 14, 1908.
K. R. VAN WINKLE.
COMBINED SHUCKING RACK AND FODDER BINDER.
APPLICATION FILED APR. 13, 1907.
2 SHEETS—SHEET 2.
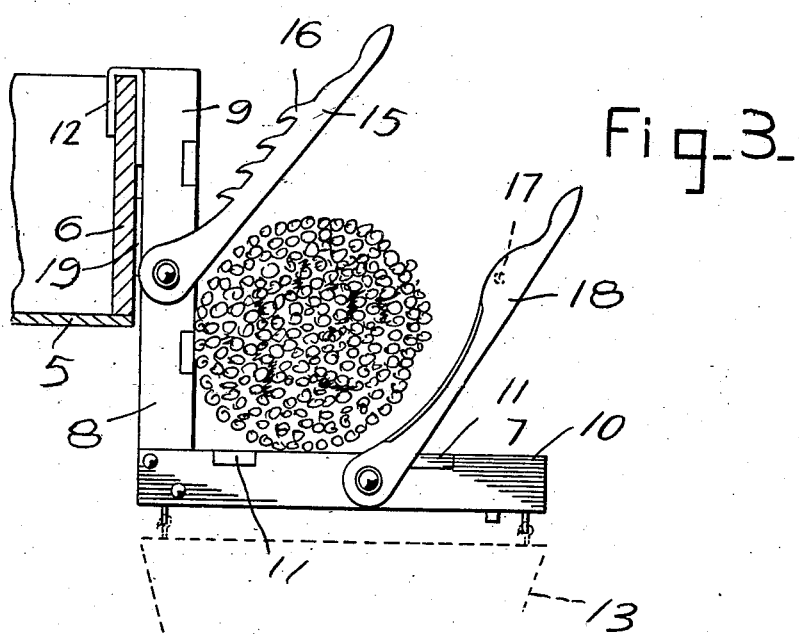
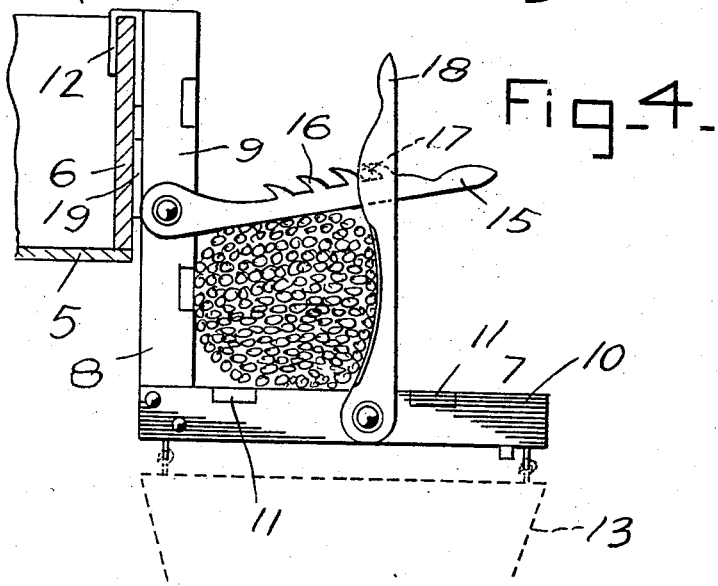
Witnesses
Inventor
K. R. Van Winkle
By Chandler & Chandler
Attorneys

UNITED STATES PATENT OFFICE.

KELLY R. VAN WINKLE, OF HILLSBORO, IOWA.

COMBINED SHUCKING-RACK AND FODDER-BINDER.

No. 884,879.   Specification of Letters Patent.   Patented April 14, 1908.

Application filed April 13, 1907. Serial No. 367,980.

*To all whom it may concern:*

Be it known that I, KELLY R. VAN WINKLE, a citizen of the United States, residing at Hillsboro, in the county of Henry, State of Iowa, have invented certain new and useful Improvements in Combined Shucking-Racks and Fodder-Binders; and I do hereby declare the following to be a full, clear, and exact description of the invention, such as will enable others skilled in the art to which it appertains to make and use the same.

The present invention has reference to combined shucking-racks and fodder-binders, and it aims to provide an exceedingly simple, durable, and inexpensive device of that nature, which is designed especially for attachment to the side or end boards of a wagon-body, and is adapted to serve both as a support for the cut corn during shucking, and as a packer for compressing the shuck or fodder while being tied in bundles.

The invention will be readily understood from a consideration of the following detailed description, and its preferred embodiment is illustrated in the accompanying drawings, in which like parts are designated by corresponding reference numerals in the several views.

Of the said drawings—Figure 1 is a front elevation of the present invention, attached to one of the side-boards of a wagon-body. Fig. 2 is a top plan view of the attachment and a portion of the side-board to which it is fastened. Fig. 3 is a side elevation of the attachment. Fig. 4 is a view similar to Fig. 3, showing the attachment in use as a binder.

Referring more particularly to the drawings, 5 designates, generally, the body or bed of a wagon, to one of the side-pieces 6 of which the attachment, designated by the reference numeral 7, is connected. This attachment, which, as above stated, is designed both for use as a supporting rack for the cut corn during shucking, and as a compression device for retaining the shucked corn stalks or fodder in place while being tied into bundles, comprises a pair of L-shaped members 8, each of which includes a vertical arm 9 and a horizontal arm 10, the corresponding arms of each member being connected by cross-pieces 11. The vertical arm 9 of each member carries at its upper end a hooked plate or claw 12, which is adapted for engagement with the upper portion of the side-board 6, for detachably connecting said members thereto.

The L-shaped members 8, which form the platform, are spaced apart a sufficient distance to permit the shucker, who faces the wagon, to stand therebetween.

The attachment may, if desired, be further provided with a basket or other receptacle 13, which is secured at opposite ends to the under face of the horizontal arms 10, such basket being designed to receive specially selected ears of corn or damaged ears, at the option of the operator. When the shuck has been removed from an ear, the latter is tossed into the wagon, the opposite side-board of which may be provided with a back-stop 14, to prevent the ears from falling outside of the wagon.

The attachment is also susceptible of use as a packer for compressing the shuck or fodder while it is being tied in bundles, and to this end a downwardly-movable lever 15 is pivoted at its rear end to the vertical arm 9 of one member, and is provided upon its upper face with a toothed rack 16, with which a finger 17, projecting laterally from an upwardly-movable lever 18, pivoted at its lower end to the arm 10 of the corresponding member, is adapted to engage. When, therefore, the device is to be used as a press, the levers 15 and 18 are swung towards each other until the finger 17, carried by the latter, engages with the rack 16, the said levers being retained in adjusted position, owing to the mutual engagement between the finger and rack, as above described.

The wagon-body is further provided with a receptacle 19 secured thereto in any desired manner and adapted to contain the twine 20, with which the compressed fodder is to be tied.

It will be apparent from the foregoing that the entire device may be readily attached to and detached from any farm wagon of conventional type, and may be secured to either the end or side pieces thereof, and that when in place the device is capable of service both as a rack for supporting the corn during shucking, and as a packer for compressing the shuck or fodder while it is being tied in bundles.

What is claimed, is—

The combination, of a rack comprising a pair of spaced L-shaped members each having vertical and horizontal arms and arranged in parallel planes, and horizontal beams connecting the corresponding arms of said members, each of the vertical arms of said members having a hooked plate secured to its rear face at the upper end thereof for engagement with a support, a downwardly-movable lever pivoted at its rear end to the vertical arm of one of said members and provided upon its upper face with a toothed rack, and an upwardly movable lever pivoted to the horizontal arm of said member and provided with a laterally projecting finger adapted for engagement with said toothed rack when said levers are moved towards each other, to compress the fodder therebetween.

In testimony whereof, I affix my signature, in presence of two witnesses.

KELLY R. VAN WINKLE.

Witnesses:
J. D. MATTHEWS,
H. C. WILMETH.